(12) United States Patent
Fleischer et al.

(10) Patent No.: US 8,854,164 B2
(45) Date of Patent: Oct. 7, 2014

(54) PRESSURE-REGULATING VALVE

(75) Inventors: Walter Fleischer, Stuttgart (DE); Klaus Schudt, Nordheim (DE); Guenther Krehl, Asperg (DE); Christof Ott, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 571 days.

(21) Appl. No.: 12/312,732

(22) PCT Filed: Sep. 24, 2007

(86) PCT No.: PCT/EP2007/060100
§ 371 (c)(1),
(2), (4) Date: Feb. 8, 2010

(87) PCT Pub. No.: WO2008/064940
PCT Pub. Date: Jun. 5, 2008

(65) Prior Publication Data
US 2010/0127197 A1 May 27, 2010

(30) Foreign Application Priority Data
Nov. 27, 2006 (DE) .......................... 10 2006 055 796

(51) Int. Cl.
*H01F 7/08* (2006.01)
*F16K 31/06* (2006.01)
*H01F 7/16* (2006.01)

(52) U.S. Cl.
CPC ....... *F16K 31/0655* (2013.01); *H01F 2007/163* (2013.01); *H01F 7/1607* (2013.01); *H01F 7/081* (2013.01)
USPC .......................................... 335/220; 335/282

(58) Field of Classification Search
USPC .......................................... 335/220
See application file for complete search history.

(56) References Cited

U.S. PATENT DOCUMENTS

| | | | | |
|---|---|---|---|---|
| 3,720,795 A * | 3/1973 | Silsby | ........................ | 360/78.04 |
| 4,215,516 A * | 8/1980 | Huschle et al. | ............... | 451/531 |
| 5,059,498 A * | 10/1991 | Hisatomi et al. | .............. | 429/345 |
| 5,455,470 A | 10/1995 | Denk et al. | | |
| 5,672,398 A * | 9/1997 | Johnson | ........................ | 428/35.7 |
| 5,694,688 A * | 12/1997 | Musch et al. | ............ | 29/895.211 |
| 5,736,211 A * | 4/1998 | Fontanilla | ..................... | 428/40.1 |
| 6,066,373 A * | 5/2000 | Floyd et al. | ................... | 428/34.3 |
| 6,224,708 B1 * | 5/2001 | Gottling et al. | ................ | 156/250 |
| 6,628,186 B1 * | 9/2003 | Wolfges | ........................ | 335/220 |
| 6,799,746 B2 * | 10/2004 | Schafer | ..................... | 251/129.07 |
| 7,036,788 B1 * | 5/2006 | Schneider et al. | .............. | 251/86 |
| 2004/0085169 A1 | 5/2004 | Matsusaka et al. | | |
| 2005/0061302 A1 | 3/2005 | Tatsu et al. | | |
| 2007/0237914 A1 * | 10/2007 | Rhodes et al. | ................ | 428/34.2 |
| 2008/0295806 A1 * | 12/2008 | Chang et al. | ................... | 123/470 |
| 2009/0002109 A1 * | 1/2009 | Stitz | ............................... | 335/281 |
| 2010/0312222 A1 * | 12/2010 | Leeflang et al. | .............. | 604/523 |

FOREIGN PATENT DOCUMENTS

| | | |
|---|---|---|
| CN | 1717559 | 1/2006 |
| DE | 199 07 732 | 8/2000 |
| EP | 0 935 262 | 8/1999 |
| JP | 47-33837 | 5/1946 |

(Continued)

*Primary Examiner* — Shawki S Ismail
*Assistant Examiner* — Lisa Homza
(74) *Attorney, Agent, or Firm* — Kenyon & Kenyon LLP

(57) ABSTRACT

A pressure-regulating valve includes a magnetic actuator and a housing. Accommodated in the housing is an armature, which is movable in a pole tube. The pole tube is encompassed by a magnetic coil. The armature is supported in the pole tube in a film structure.

6 Claims, 2 Drawing Sheets

(56) References Cited

FOREIGN PATENT DOCUMENTS

| | | |
|---|---|---|
| JP | 53-324 | 1/1978 |
| JP | 56-17473 | 2/1981 |
| JP | 59-107378 | 7/1984 |
| JP | 59-107379 | 7/1984 |
| JP | 59-107380 | 7/1984 |
| JP | 60-126160 | 8/1985 |
| JP | 61-131576 | 8/1986 |
| JP | 63-142487 | 9/1988 |
| JP | 64-51765 | 3/1989 |
| JP | 3-2978 | 1/1991 |
| JP | 3-32267 | 3/1991 |
| JP | 3-60663 | 6/1991 |
| JP | 4-127870 | 4/1992 |
| JP | 8-109973 | 4/1996 |
| JP | 2000-146003 | 5/2000 |
| JP | 2001-227669 | 8/2001 |
| WO | WO 2004/048831 | 6/2004 |

* cited by examiner

US 8,854,164 B2

PRESSURE-REGULATING VALVE

BACKGROUND OF THE INVENTION

1. Field of the Invention

The present invention relates to an electromagnetically actuated pressure-regulating valve.

2. Description of Related Art

In modern passenger-car automatic transmissions, hydraulically actuated clutches are used for changing gears. In order for the shifting operations in the automatic transmissions to proceed smoothly and imperceptibly for the driver, it is necessary to adjust the hydraulic pressure at the clutches with the highest pressure precision, in accordance with predefined pressure ramps. Electromagnetically actuated pressure-regulating valves are used for adjusting the pressure ramps mentioned. The pressure-regulating valves are generally in a seat type of construction or valve-piston type of construction. The pressure level required is achieved via a pressure balance integrated in the valve, the force of the electromagnet, changeable as a function of current, being brought into equilibrium with the hydraulic force on the valve seat.

In order to achieve the requisite pressure precision, it is necessary that the magnetic force, changeable by the coil current, take a course corresponding to an exact characteristic curve. Mechanical friction within the electromagnet—particularly in the case of the armature bearing—leads to hysteresis in the magnetic force and therefore to inexactness in the regulating pressure.

For cost reasons, electromagnets are used today for the applications with respect to passenger-car automatic transmissions indicated above, in which the component for the radial infeed of the magnetic flux into the armature (magnet core) and the component representing the complementary magnetic pole for the magnet armature (pole body) are combined to form one component known as a pole tube. To avoid a magnetic short-circuit in a pole tube, for instance, a V-shaped groove is introduced into this component. The magnetic iron cross-section reduced in this manner in the groove already enters a state of saturation in response to low coil currents, and thereby acts like a separating air gap. Ideally, in these pole-tube designs, the armature is supported directly in the pole tube, so that little expenditure is necessary for additional bearing components. Moreover, because of the small air gaps, a high magnetic efficiency and consequently a high magnetic force may therefore be attained.

However, the disadvantage in this embodiment variant of the bearing assembly is the circumstance that relatively high magnetic transverse forces develop, which lead to increased friction and therefore hysteresis and inexactness of pressure. In order to offset this disadvantage, in the known examples, coatings are used which act to reduce friction and which provide for a magnetic separation in the secondary gap between armature and pole tube. As a rule, however, these coatings are costly to produce because they require the handling of individual parts during the coating process as well as, in some instances, a mechanical postprocessing of the coating to attain the necessary geometrical accuracy. In addition, the coatings used under the state of the art do not achieve the optimal coefficient of friction which, for example, could be achieved by the use of a Teflon bearing.

Published U.S. patent application 2004/0085169 A1 discloses an electromagnetic actuator including a sliding section, i.e., an armature and a stator. The stator together with the sliding section, the armature, form a magnetic circuit. To accommodate and support the armature, the stator includes an accommodation section within which the armature is able to move back and forth. A coil generates a magnetic force for displacing the armature in one of the two directions. To reduce the friction between the stator and the sliding section, the location hole for accommodating the armature is coated with nickel phosphate, the phosphorus content varying in a range between 5 and 15% by weight.

BRIEF SUMMARY OF THE INVENTION

According to the present invention, it is provided to prepare the support of an armature part in a pole tube via a thin film, which replaces a coating used in known methods heretofore. A film, implemented ideally as a glass-fiber fabric, forms a support structure which lends the necessary mechanical stability to the friction-reducing PTFE or Teflon material. Preferably, the thin film is produced as a mat-type glass-fiber fabric, on which PTFE is applied on both sides in a sintering process, to name one example. The film provided on both sides with PTFE is pliable and may be rolled into a structure such as a sleeve, for example. During such a preforming of a section of the film mat into a sleeve-shaped configuration, the film material, provided on both sides with PTFE, undergoes a shaping specific to the application.

The thickness of the glass-fiber fabric is selected to be in a range between 30 μm and 150 μm. In the case of lesser thicknesses of the film material, the magnetic transverse force increases too sharply; if the thickness is greater, the magnetic efficiency factor suffers.

Advantageously, the film material made of a strip stock may be cut in a strip shape from the strip stock and preformed into a sleeve, while forming a joint of the two open ends. Subsequently, the film material bent into a sleeve shape may be preassembled in the pole tube. The pretension which the preformed sleeve undergoes in the pole tube is sufficient to fix it in position. This means that no further additional processes for fixing the preformed sleeve in position in the pole tube while forming a joint, in particular, no joining operations of the two open ends which lie close to each other along the joint, are necessary. For example, if the film is inserted into the interior of the pole tube, then after the armature is mounted, the film forms a separating and friction-reducing layer between the pole tube and the envelope of the armature. In this context, it is unimportant whether the armature glides on the preformed film structure or whether the armature and film glide relative to the pole tube in the course of the existing axial play. This allows a particularly simple and inexpensive formation of a low-friction armature bearing in a pole tube. The starting material of the film material exhibits only insignificant thickness-tolerance fluctuations, which, however, can be permitted given a thickness range between 30 μm and 150 μm; very good coefficients of friction are attainable.

DETAILED DESCRIPTION

Figure 1:
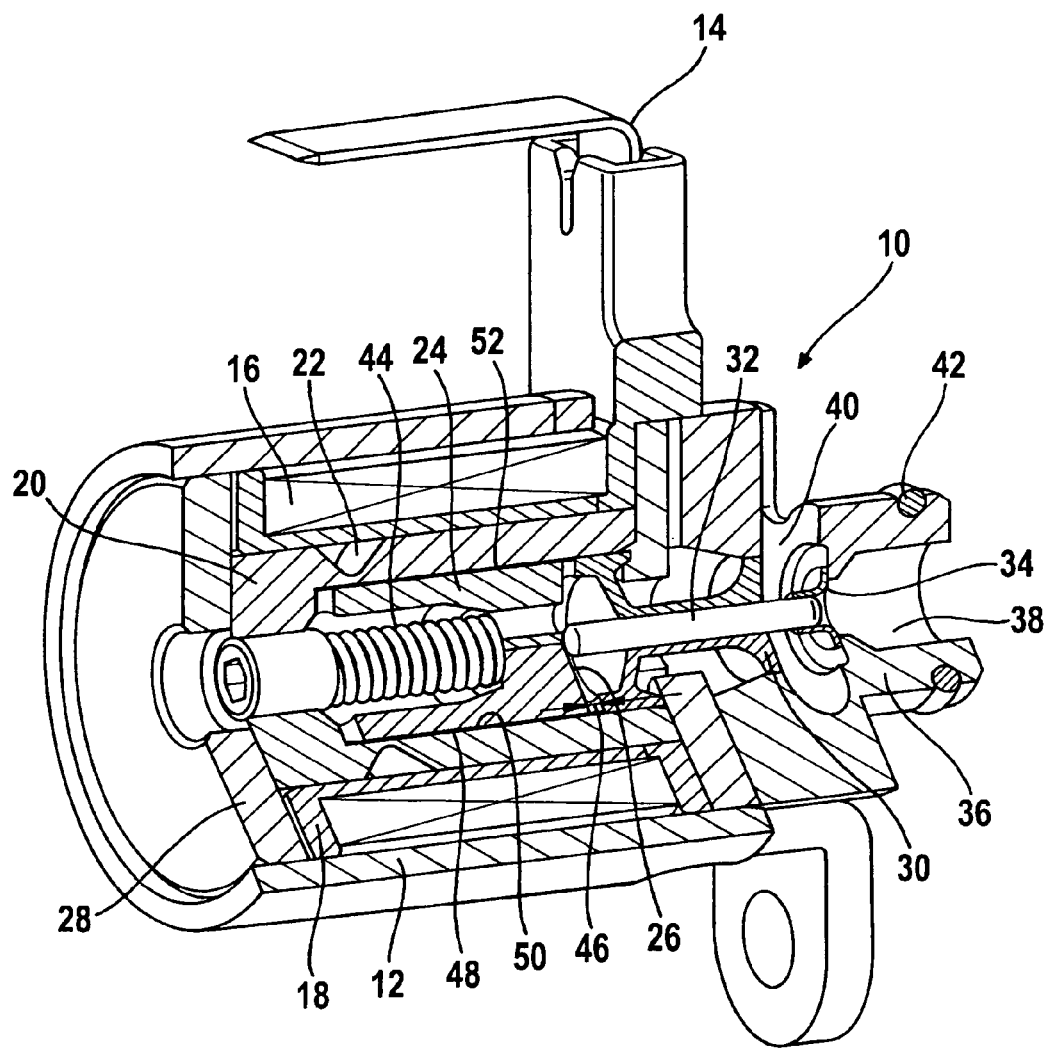
FIG. 1 shows a perspectively rendered section through a pressure-regulating valve.

FIG. 1 shows a section through a pressure-regulating valve, represented in perspective.

It can be seen from the view according to FIG. 1 that a pressure-regulating valve 10 includes a housing 12, which has a plug-in connection 14. Plug-in connection 14 is used for the electrical contacting of a magnetic coil 16 which, embedded in a coil form 18, is accommodated in housing 12 of pressure-regulating valve 10. Also located in housing 12 of pressure-regulating valve 10 is a pole tube 20, at whose periphery a recess 22 configured as a V-groove is formed. This formation influences the magnetic flux through pole tube 20. Pole tube 20 delimits an interior space in which a cylindrical armature 24, whose armature end face is denoted by reference numeral 26, may be moved back and forth depending on the energizing of magnetic coil 16. Armature 24 is acted upon by a spring 44 which, with the interposition of a sleeve, is supported either on pole tube 20 or perhaps on a closing cover 28 by which housing 12 of pressure-regulating valve 10 according to the illustration in FIG. 1 is closed.

Armature 24 is movable axially in both directions within pole tube 20 according to a stroke length 46, and acts upon a push rod 32 on which a valve part 34 is accommodated. Valve part 34 is disk-shaped and cooperates with a seat, which delimits an inflow 38 of a hydraulic part 36. An outlet, denoted by reference numeral 40, runs in hydraulic part 36, as well. A sealing ring 42, inserted into a groove, is located at the periphery of hydraulic part 36.

Armature 24 according to the perspective view in FIG. 1 has on its envelope 50 a film 52, which is preferably a glass-fiber fabric and is provided on both sides with PTFE. Film 52 employed is prebent as a cylinder sleeve, so that a butt joint is formed at the facing ends, a gap always remaining at the ends, however. The formation of an open butt joint, that is, a butt joint forming a gap between the ends facing flush opposite each other, lends the sleeve-shaped prebent film an internal stress, so that it may easily be mounted and positioned in pole tube 20, for example. The pretension of film 52, taking the form of a preformed sleeve, together with the axial end stops at pole tube 20 and plain bearing 30, is sufficient to fix it in position in pole tube 20. This means that no further additional processes like, for instance, fixation of the sleeve in pole tube 20 are necessary.

After armature 24 has been mounted, film 52 therefore forms a separating and friction-reducing layer between pole tube 20 and armature 24. In this context, in principle, it is unimportant whether armature 24 glides on film 52 accommodated in pole tube 20, or whether armature 24 and film 52 are able to glide in the axial direction in pole tube 20 within the course of the axial play existing between armature 24 and pole tube 20.

Film 52, for which preferably glass-fiber fabric is used as support material to provide mechanical stability, is provided with PTFE on its outer surface, i.e., on the surface showing toward pole tube 20, as well as on its inner surface area, that is, the surface showing toward the envelope of armature 24.

Figure 2:
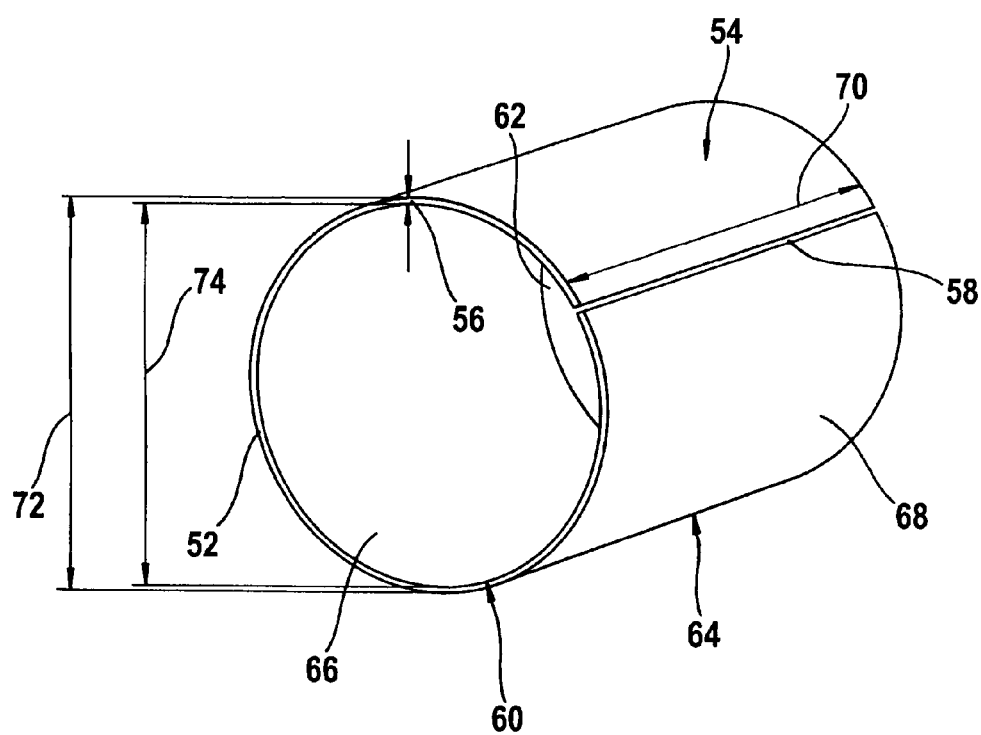
FIG. 2 shows a perspective representation of the preformed film material bent into a sleeve shape and forming a joint.

A perspective view of the film provided according to the present invention may be gathered from the depiction according to FIG. 2.

The depiction according to FIG. 2 shows that film 52 is prebent into sleeve form 64 and has an interior portion 66 and an exterior portion 68. A butt joint, denoted by reference numeral 58, runs along a length extending over axial length 70 of sleeve form 64. The two ends of the material of film 52, preferably cut off from a strip stock, lie opposite each other at butt joint 58, a space remaining between both ends. Sleeve form 64 lends to the material of film 52, which is used as support material for PTFE material 54, a pretension important for the mounting and positioning. Preferably, the thickness of the material of film 52 lies in a range between 30 µm and 150 µm. The thickness of the material of film 52 is indicated by reference numeral 56. Reference numeral 72 denotes the length in a direction perpendicular to axial length 70 of sleeve form 64 including the thickness of the material of film 52. Reference numeral 74 denotes the length in a direction perpendicular to axial length 70 of sleeve form 64 excluding the thickness of the material of film 52. Sleeve form 64 has a first open end face 60 and a second open end face 62.

If glass-fiber fabric is used as support material for film 52, it may be produced inexpensively. In particular, the film material used is distinguished by only small thickness-tolerance fluctuations. Because of the pretension and because of remaining butt joint 58, film 52 in sleeve form 64 may be mounted easily and supplies excellent frictional properties, that is, the friction between envelope 50 of armature 24 and the inner circumferential area of pole tube 20 may be reduced decisively.

Moreover, the support of armature 24 in pole tube 20 with the aid of film 52 and the formation of sleeve form 64 offer the advantage that film 52 may be cut as a strip from a strip-shaped material and preshaped extremely easily into sleeve form 64, while forming joint 58. This preform component, which has sleeve form 64, may be mounted and positioned very easily and with few mounting steps in pole tube 20, that is, at its inner surface area 48.

What is claimed is:

1. A pressure-regulating valve, comprising:
   a housing; and
   a magnetic actuator located within the housing, the magnetic actuator including a pole tube, a magnetic coil encompassing the pole tube, and an armature configured to travel within the pole tube, wherein the armature is supported in the pole tube in a film structure,
   wherein the film structure has a sleeve form and a butt joint,
   wherein inner and outer surface areas of the film structure are coated with friction-reducing PTFE material,
   wherein the film structure is glass-fiber fabric providing mechanical stability to the PTFE material,
   wherein the pole tube has a partial recess disposed within the pole tube toward a closing cover, wherein a pole tube width at the partial recess is less than a width elsewhere along the pole tube, the partial recess representing a narrow spot with respect to the magnetic separation, wherein the partial recess enters a state of saturation at low coil currents of the magnetic coil.

2. The pressure-regulating valve as recited in claim 1, wherein the film structure has a sleeve form and is positioned on an envelope of the armature.

3. The pressure-regulating valve as recited in claim 1, wherein the film structure has a sleeve form and is positioned on an inner surface area of the pole tube.

4. The pressure-regulating valve as recited in claim 1, wherein the film structure has a sleeve form and a friction-reducing PTFE material at least on an outer surface area of the sleeve form.

5. The pressure-regulating valve as recited claim 1, wherein a thickness of the film structure lies in a range between 20 µm and 200 µm.

6. The pressure-regulating valve as recited in claim 1, wherein the film structure has a sleeve form and is fixedly mounted on one of an inner surface area of the pole tube or on an outer envelope of the armature.

\* \* \* \* \*